Nov. 10, 1970  S. C. KNIGHT  3,538,625
INSTANT RESPONSE SYSTEM FOR LANGUAGE LABORATORY AND METHOD
Filed Sept. 17, 1968
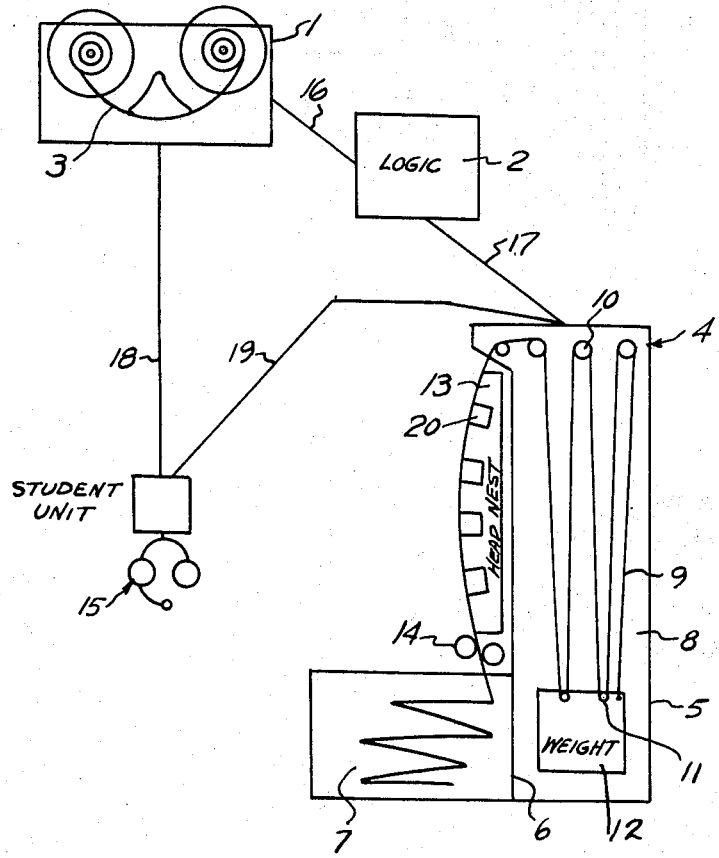
INVENTOR
SIDNEY C. KNIGHT
BY *Cullen, Sloman, & Cantor*
ATTORNEYS

3,538,625
INSTANT RESPONSE SYSTEM FOR LANGUAGE LABORATORY AND METHOD
Sidney C. Knight, Southfield, Mich., assignor to Instructomatic, Inc., Detroit, Mich., a corporation of Michigan
Filed Sept. 17, 1968, Ser. No. 760,265
Int. Cl. G09b 5/04
U.S. Cl. 35—35                                 5 Claims

ABSTRACT OF THE DISCLOSURE

In an electronic class room which includes one or more lesson sources, a plurality of student units including amplifiers and head phones and suitable electrical controls, an instant replay system which comprises moveably mounting a fixed length of a magnetic tape to move over guides in one direction past a pick up and into a storage chamber to record the lesson source and the student's response thereto over a portion of its length and a weight on the trailing end of the student tape elevated during said recordings over a portion of the length of said student tape, and controls to release the student tape, the weight dropping by gravity to instantly return the tape to a replay position of the recorded source and student response, and the method of providing said instant rewinding for replay of the recorded lesson source and student response.

---

It is an object of the present invention to provide an instant replay device by which upon playing of the lesson source or an element of said source, the same is immediately recorded upon a student lesson tape after which the student immediately dictates his response also recorded upon the student lesson tape while the said tape which is of a fixed and limited length moves longitudinally in a first direction from a tape housing to a tape storage area, the trailing end of the tape being weighted so that upon release of the feed mechanism for the student tape there is an instant return of the tape in the opposite direction back into the tape chamber repositioning the same for an immediate replay and listening by the student of the lesson source and his response to thus provide an audible comparison of his response to the original, beneficial to the student in acquiring skills in language or in the correction of speech, or in any learning situation where such a comparison is beneficial.

It is another object to provide a responder housing and control logic and circuitry therefor by which a lesson phrase is accurately measured during its recording upon the student tape and where an estimated time is provided for student response after which there is provision for automatic release of the tape for return by gravity to its initial position to thus provide for an instant replay of the recorded lesson source and student response, during which period the logic is controlling the stopping and starting of the lesson source.

It is another object of the present invention to provide a method which consists of a series of steps by which a lesson source may be recorded upon a student tape followed by a recording of the student response and an instant return of the student tape by gravity to its initial position to provide for an immediate replay of the recorded lesson source and student response.

It is another object to provide logic control system which accurately measures the phase length of the lesson source and the student response so as to avoid any delay in replay resulting from varying phrase lengths and to thus provide a means for instant return of the recorded source and student response for a prompt and successive replay thereof for the student's benefit.

These and other objects will be seen from the following specification and claims in conjunction with the appended drawing in which:

The figure schematically illustrates the present instant replay system in a diagram illustrating its relation with an electronic classroom and its components.

In accordance with the present invention, sound is taken, usually a voice from a prerecorded tape and played to a classroom of students in a laboratory environment. Simultaneously this sound or voice is re-recorded on a replay system which includes a secondary magnetic tape. Immediately after the original sound or voice is recorded, the student may repeat that sound or voice and his voice will be recorded by the present instant replay system after which both the recorded original voice or sound and the student's response will be immediately replayed.

In accordance with the present device, regardless of the length of the lesson phrase, the student is not required to wait for any fixed period but on the other hand the control mechanism measures automatically the original phrase length and allows an adequate response time before causing the instant replay system to rewind and replay the phrase and student's response. Thus the instant replay or rewind and replay is determined solely by the length of the original lesson phrase and length of student response rather than provide a fixed interval of time delay between stopping and starting of the lesson source regardless of phrase length.

Referring to the drawing the present device is made up of four major components.

The program source 1, which may be a standard tape deck equipped with a prerecorded tape or other lesson source for illustration and means for feeding and take up, which may include a foreign language or a speech correction lesson or any other sound such as may be used in an electronic classroom. Such program source has normally provided upon the tape thereof, if a tape is used, a series of lesson sources which are usually interrupted, thus provide a series of successively presented lesson source elements.

An electronic logic package is designated at 2 which contains the necessary but conventional circuitry for activating the master program source and the instant replay system for starting and stopping and rewinding at the proper time.

An example of such controls for actuating and deactuating tape winding and rewinding, as well as connections for listening to teaching material and dictation of student response on tape for playback of same, is shown in U.S. Pat. No. 3,155,778 dated Nov. 3, 1964.

The structure and detail of the logic element 2 is not further disclosed except to indicate that it is adapted to provide by suitable circuitry 16, 17, 18 and 19, proper connections between the program source 1, the student unit 15 and the instant replay unit 4, which is the major component in the present disclosure.

The logic 2 is adapted to activate the program source 1 and to activate the amplifier and head phones, 15, energize the magnetic pick up and head 13 and to control activation of the pinch feed rollers 14, which are motor driven.

The program source 1 includes a tape or other means 3 by which the previously recorded lesson source or program source is moveably mounted upon the tape deck forming a part of said source for transmission to the logic 2 and connections 16 and 17 to the multiple head pick up 13 mounted upon housing or support 5 of the instant replay system.

Said housing may be a plastic case if desired and is partitioned at 6 to define storage chamber 7 and tape chamber 8.

The fixed length of magnetic tape, 9 is normally positioned initially within tape chamber 8 guideably and moveably mounted over a series of rollers or pulleys 10 with associated tape guide means 11. The trailing end of the tape 9 is anchored to the weight 12 whereby as the tape 9 is fed longitudinally over the pulleys 10 and past the multiple pick up 13, the said weight will be elevated within chamber 8.

The fixed length of tape 9 which in the illustrative embodiment is a magnetic tape and may have upon it a series of parallel tracks as for example, four tracks to thus provide for the recording of the responses of four different students from individual student units 15 forming a part of the general language laboratory set up as hereafter described.

In the illustrative embodiment the student lesson tape 9 is six feet in length for illustration, less than two ounces in one embodiment of the present invention. Under the circumstances the weight 12 exceeds the weight of the tape and is approximately two ounces for the purpose hereafter set forth for instant return of the longitudinally fed tape at the correct time.

A motor operated pair of feed pinch rolls, 14 are mounted upon housing 5 adjacent storage chamber 7 and are adapted to receive and drivingly engage the magnetic tape 9 for moving the same in a first direction longitudinally past the pick up 13 at the same time elevating the weight 12 within chamber 8.

Under the control of the logic 2, the program source as it dictates or plays a portion of the lesson source such as the first element thereof measures its phrase length as the tape 9 is fed past the head 13 and also measures or provides for a limited additional period for the student to make a prompt response.

When the weight 12 is all the way to the bottom of the tape chamber 8, it is in the "start" position. As the pinch rollers 14 are activated by the logic 2, the tape 9 begins to pull past the heads 13 and is collected in the storage chamber 7. While this is going on, master voice and the student's responses are successively recorded on tape 9 and this causes the weight to elevate in chamber 8.

When the logic acknowledges that the recording has been completed measuring the length of the same, the pinch rollers 14 are automatically disengaged from the tape 9 and the weight is permitted to move by gravity to pull the tape out of the storage chamber back into its original configuration substantially all within chamber 8, but leaving sufficient of the leading end of the tape 9 projected down into a suitable slot within the top of the storage chamber 7 so as to guide the same there into when the tape reurns on replay.

As soon as the rewind has occurred, which in an illustrative embodiment takes less than one second approximately, the logic again causes the pinch roller to reengage the tape 9 by pulling the tape back across the heads 13 a second time. During this cycle, the student hears the rerecording of first the original master recording and second his recorded response to that original recording. This cycle may be repeated as often as the student is participating in this portion of the instruction. For practical purposes there is only normally the one repetition of the rerecording so that the student can hear again the recorded lesson source element and his recorded response and thus can make audible comparison for learning purposes.

After the said replay of the recorded lesson and response, the logic again releases the pinch roller 14 and the weight 12 is effective again to move the tape longitudinally in the opposite direction back to its initial position substantially within chamber 8. As the logic activates the program source, it will be activating the next lesson source or phrase element therein and this second lesson source is then recorded simultaneously erasing the previous tape recording upon the student tape 9 and the recording continues to record the student's response directly upon the tape 9 and the cycle is repeated. The following advantages are hereunder set out and are provided in the present invention:

1. Any standard listen-pause lesson material used by the school or university may be used in the present system.

2. Regardless of the length of the phrase, the student is not required to wait for a fixed period of time before each phrase. This is accomplished since the logic measures the original phrase length and allows an adequate response time before causing the instant replay system to rewind and replay, and reactivate the lesson source.

3. The present weight concept for quick rewind of the tape requires no motor drive and therefore minimizes maintenance problems.

4. Each instant replay system will handle four students since a four-track tape 9 may be employed. Thus such simplicity of operation permits a less costly product to be made available for learning purposes.

5. The entire instant replay system can be remotely located out of the student's reach.

6. The entire operation is fully automatic once started by the instructor. The present instant replay system may be employed as an add-on feature of an existing electronic classroom.

The present invention is furthermore directed to the following method which includes the steps hereunder listed:

1. Transmitting a lesson source 1 to a pick up head 13.

2. Moveably mounting and driving as at 10–14, the fixed length of student responder magnetic tape 9 for movement in a first direction past said head to record thereon said lesson source.

3. Said student tape moving continuously past said pick up head recording the student response to the lesson source.

4. Progressively storing said student tape within chamber 7 as it accumulates.

5. Moveably mounting the weight 12 upon the trailing end of tape 9 elevating the said weight during said movement of said tape in said first direction; and releasing said tape; said weight instantly returning said tape in the opposite direction repositioning the same for an instant replay of the recorded lesson source and student response.

Present method also includes the intermediate step of automatically measuring through the logic the phrase length of the lesson source as it is recorded on the student tape and allowing an additional student response time before controlling the release of the tape; namely, the release of the pinch rolls 14 for substantially instant return and rewind in the opposite direction of the student tape, and the stopping and starting of the lesson source.

ILLUSTRATIVE INSTANT REPLAY SYSTEM

|   | A | B | C | D |
|---|---|---|---|---|
| 1 | Master source | Play master source | Blank space on tape | Stop. |
| 2 | Student hears | Master source |  | Master source repeated. |
| 3 | Student responds |  | Student responds | Stop. Student response repeated. |
| 4 | Responder records | Master source | Response recorded |  |

Having described my invention, reference should now be had to the following claims.

I claim:

1. In an electronic classroom, including a pre-recorded program source, a plurality of student units each including an amplifier and head phones;

the improvement of an instant replay system which comprises:

a support;

guide means on the support for moveably mounting a fixed length of magnetic student tape;

a multiple head magnetic pick up on said support receiving said moveable student tape;

power operated pinch rolls on said support adapted to engage and feed one end portion of the student tape longitudinally in one direction past said pick up;

and a weight anchored to the other end of the student tape moveable upward during movement of said tape in said first direction;

said weight adapted upon release of said pinch rolls to drop by gravity, instantly refeeding said student tape in the opposite direction.

2. In the electronic classroom of claim 1, said support including a tape chamber and a tape storage chamber;

said tape moving from the tape chamber into said storage chamber when moving in said first direction, and withdrawing from said storage chamber and moving into said tape chamber when moving in the opposite direction.

3. In the instant replay system of claim 1, said guide means including tape guides on said support and upon said weight, providing a series of longitudinal courses of student tape thus accommodating substantially the full length of said student tape.

4. In the instant replay of claim 1, said student tape having a plurality of tracks corresponding to a plurality of student units respectively, whereby each track is adapted to receive and record the lesson source and successively the individual student's response.

5. The method of providing for instant replay of a recorded lesson source and student response in an electronic classroom which includes the following steps:

(1) transmitting a lesson source to a pick up head;

(2) moveably mounting and driving a fixed length of student responder magnetic tape for movement in one direction past said pick up head to record said lesson source;

(3) said student tape moving continuously past said head recording the student response to the lesson source, said lesson source and student response being recorded successively upon said student tape;

(4) moveably mounting a weight upon the trailing end of the student tape elevating said weight during movement of the student tape in the first direction;

(5) releasing said tape, said weight instantly returning said tape in the opposite direction, repositioning the same for an instant replay of the recorded lesson source and the student response.

References Cited

UNITED STATES PATENTS 3,155,778   11/1964   Meyer _____ 35—35.3 X

WILLIAM H. GRIEB, Primary Examiner

U.S. Cl. X.R.

226—50